United States Patent [19]

Fénart

[11] 4,137,786
[45] Feb. 6, 1979

[54] SPEED CHANGE DEVICE

[75] Inventor: Jean-Claud Fénart, Fourqueux, France

[73] Assignee: Societe Anonyme Francaise du Ferodo, Paris, France

[21] Appl. No.: 784,719

[22] Filed: Apr. 5, 1977

[30] Foreign Application Priority Data

Apr. 15, 1976 [FR] France ................................ 76 11163

[51] Int. Cl.² ........................ F16H 55/52; F16H 55/56
[52] U.S. Cl. ........................ 74/230.17 E; 74/230.17 A; 74/230.17 C; 29/426
[58] Field of Search ............... 74/230.17 A, 230.17 C, 74/230.17 E, 230.17 B, 230.17 M, 230.17 P, 230.3; 285/305; 403/369, 370, 371; 29/426

[56] References Cited

U.S. PATENT DOCUMENTS

| 1,881,980 | 10/1932 | Thomas, Jr. | 285/305 |
|---|---|---|---|
| 2,021,241 | 11/1935 | Mall | 285/305 |
| 2,480,222 | 8/1949 | Carlson | 74/230.17 C |
| 2,573,197 | 10/1951 | Hart | 74/230.17 B |
| 2,677,283 | 5/1954 | Firth | 74/230.17 F |
| 2,816,452 | 12/1957 | McCloskey | 403/369 |
| 2,957,359 | 10/1960 | Wuertz | 74/230.17 C |
| 3,491,608 | 1/1970 | Trofimov | 74/230.17 C |
| 3,527,485 | 9/1970 | Goward et al. | 285/305 |
| 3,571,884 | 3/1971 | Chung | 74/230.17 C |
| 3,628,768 | 12/1971 | Hutt | 285/305 |
| 3,753,582 | 8/1973 | Graham | 285/305 |
| 3,808,900 | 5/1974 | Vadeboncoeur et al. | 74/230.17 E |
| 3,811,331 | 5/1974 | Moogk | 74/230.17 A |
| 3,906,808 | 9/1975 | Zaiser et al. | 74/230.17 E |
| 4,020,711 | 5/1977 | Woollard | 74/230.17 A |

FOREIGN PATENT DOCUMENTS

| 452584 | 5/1913 | France | 74/230.17 C |
|---|---|---|---|
| 2288257 | 5/1976 | France | 74/230.17 C |
| 907945 | 10/1962 | United Kingdom | 74/230.17 A |

Primary Examiner—Benjamin W. Wyche
Assistant Examiner—William R. Henderson
Attorney, Agent, or Firm—Charles E. Brown

[57] ABSTRACT

A belt-type speed change device having a pair of pulleys around which passes a belt. A side plate of each of the pulleys is axially movable relative to the other, fixed, side plate, thereby to provide for changes in transmission ratio. A rest position of the movable side plate of one of the pulleys, in embodiments described the driven pulley, is defined by a first abutment. The first abutment is movable between an operative position in which it is engageable by the movable side plate to define the rest position of the movable side plate and a retracted position in which the first abutment permits further axial movement of the movable side plate away from the fixed side plate to a retracted position as defined by a second or stop abutment, thereby to permit removal of the belt from the pulleys.

21 Claims, 10 Drawing Figures

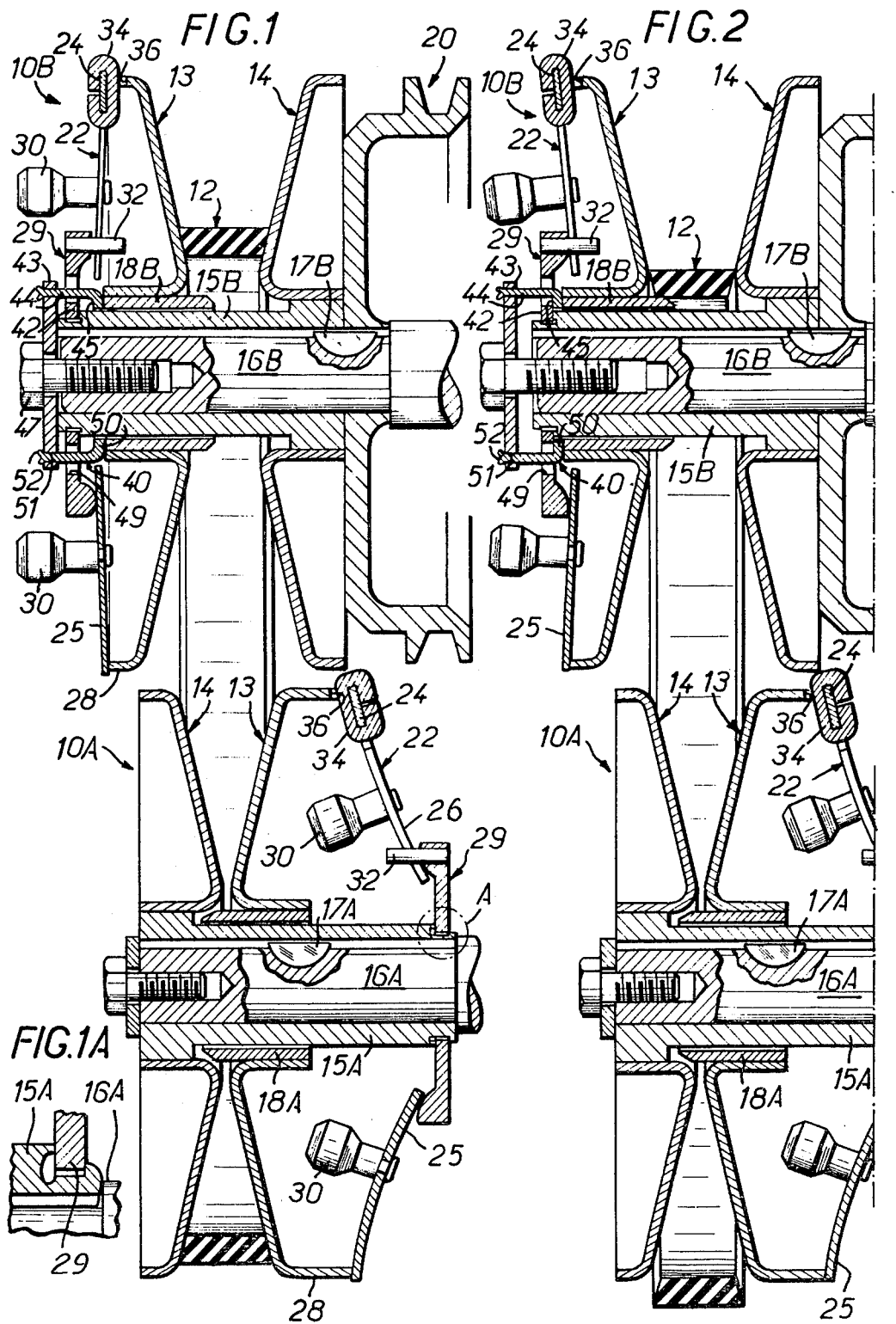

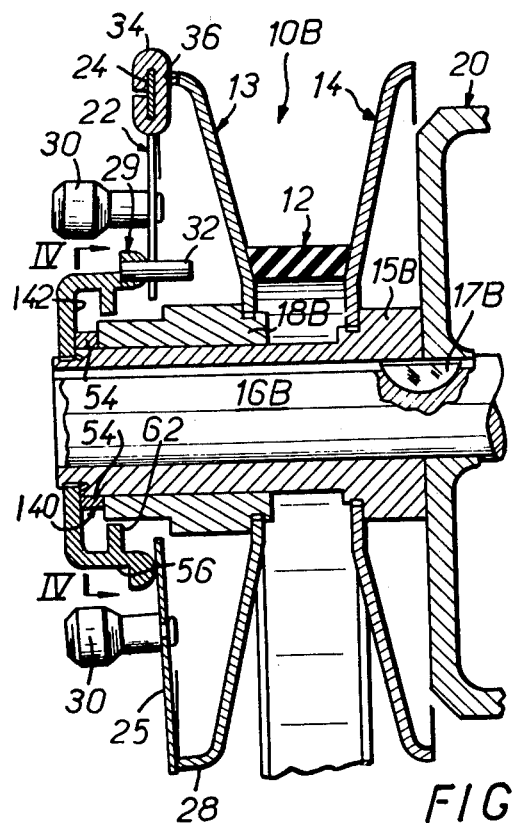
FIG.5
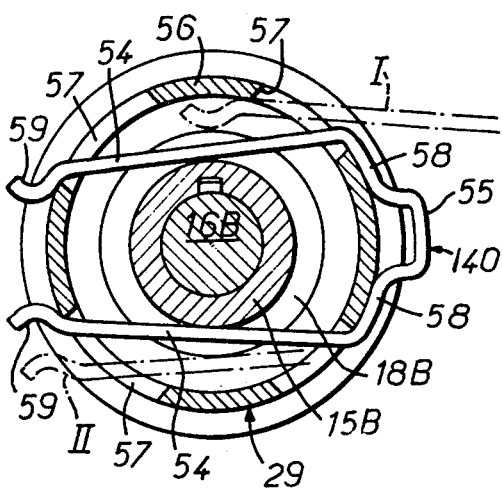
FIG.4
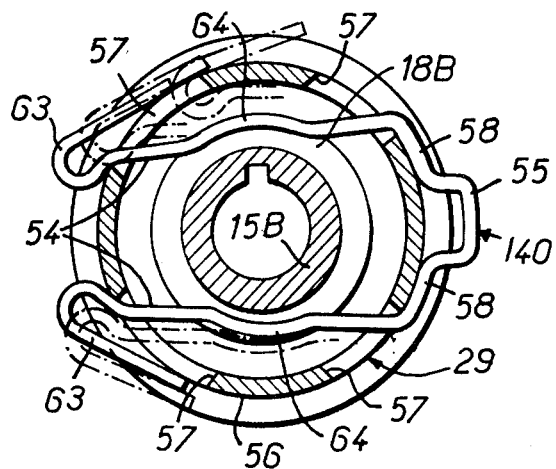

SPEED CHANGE DEVICE

BACKGROUND OF THE INVENTION

Belt-type speed change devices or variable transmission units are known, for the controlled driving of any appropriate member from a suitable drive means. For example, such a device may be used on a motor vehicle, for driving, from the motor vehicle engine, an auxiliary component of the vehicle such as an alternator, water pump or fan as are usually found in a motor vehicle.

Such a speed change device may comprise two oppositely disposed coaxial side plates, which are arranged coaxially with each other and one of which is fixed and the other of which is movable relative thereto by resilient return means. The side plates each having frustoconically extending portions defining a tapered groove, and the belt sits within said tapered groove so that when the movable side plate of one pulley moves closer towards its associated fixed side plate, the belt is urged radially outwardly relative to that pulley, riding radially outwardly on the inclined side faces of the groove. Conversely, the belt is displaced radially inwardly on the other pulley, being so permitted by the movable side plate of that pulley moving axially away from the fixed side plate, thus increasing the width between the inclined side faces of the groove in that pulley. The movable side plate has a rest position defined by an abutment whose position is so determined as to provide a given transmission ratio between the two pulleys, as when starting up the transmission device.

In speed change devices of this kind, the belt is invariably subject to wear, so that it must be possible to change the belt when required. In practice, and taking account of the constraints and limitations in regard to installation of such a speed change device, such a drive usually being installed at the front of the engine between the engine block and the water-cooling radiator, it can frequently happen that changing the belt of such a device requires removal of the radiator and other associated components, and is particularly troublesome for that reason.

There are also known speed change devices in which it is possible to displace the movable side plate of one of the pulleys for belt changing, but this involves partial disassembly of the pulley. This disassembly process is obviously inconvenient, and it may happen that a person unfamiliar with the pulley construction may proceed completely to disassemble the pulley, although this is not usually necessary.

SUMMARY OF THE INVENTION

An object of the present invention is to provide a speed change device which permits easy changing of the drive belt.

Another object of the invention is to provide a speed change device in which at least one of the pulleys can be so adjusted as to permit the drive belt to be readily first from the other pulley and then from the first-mentioned pulley.

Yet another object of the invention is a speed change device of the kind mentioned above, in which the first-mentioned pulley has a clearly defined rest position in normal operation, thereby to define a fixed limit to the operational variation in the transmission ratio between the two pulleys, but which provides for further movement beyond the rest condition to permit a belt to be changed.

A further object of the invention is to provide a speed change device in which a pulley does not need to be disassembled in order to remove and change the drive belt.

These and other objects are achieved in a speed change device of the kind comprising two pulleys around which is passed an endless belt. Each of the pulleys comprises two co-axial side plates, each of which has a frustoconically extending side wall, where the pulley defines a tapered groove into which the drive belt engages. One of the side plates of each pulley is fixed and the other side plate is mounted movably axially relative thereto, from an initial rest position defined by an abutment. At least one of the pulleys, further has a second or stop abutment which is spaced axially from the first-mentioned abutment, at the side thereof which is axially remote from the fixed side plate. The first abutment is retractable with respect to the movable side plate, between a first operative position in which it prevents movement of the movable side plate away from the fixed plate beyond the initial rest position, and a retracted position in which the first abutment permits the movable side plate to move axially further away from the fixed side plate beyond its initial rest position, to a fully retracted position, for changing the belt. The second or stop abutment defines the fully retracted position of the movable side plate, and is axially fixed with respect to the fixed side plate.

The second or stop abutment thus prevents undesired disassembly of the pulley.

In an embodiment of this invention, the first abutment is mounted axially movably between its first or operative position and its retracted position, said first position being axially displaced from the stop abutment towards the fixed side plate and the retracted position being a position in which the first abutment bears against the stop abutment. Thus, the stop abutment limits the axial movement of the first abutment, in an axial direction away from the fixed side plate.

Alternatively, the first abutment is mounted radially movably between its two positions, in contact with or adjacent to the stop abutment. In this case, the stop abutment advantageously provides for transverse guiding of the first abutment in its radial retracting movement.

It will be appreciated that the movement of the movable side plate away from the fixed side plate, as permitted by retraction of the first abutment, is sufficient to permit the drive belt to be removed for changing same. In addition, moving the first abutment from its first to its retracted position, and returning it to its first position, can be effected rapidly and easily using simple tools, or even without using any tool at all.

BRIEF DESCRIPTION OF THE DRAWINGS

FIG. 1 is an axial cross-sectional view of one embodiment of a speed change device according to the invention;

FIG. 1A shows the detail part of FIG. 1 indicated at A, on a larger scale;

FIG. 2 is a view similar to FIG. 1, showing the configuration of a pulley of the FIG. 1 speed change device in the condition in which the drive belt can be removed from the other pulley, for subsequent complete belt removal;

FIG. 3 is an axial cross-sectional view of part of an alternative embodiment of the speed change device of the invention;

FIG. 4 is a transverse sectional view of the FIG. 3 construction, in section along line IV—IV in FIG. 3;

FIG. 5 is a view similar to FIG. 4, showing yet another embodiment of the invention;

DESCRIPTION OF THE PREFERRED EMBODIMENTS

Figure 6:
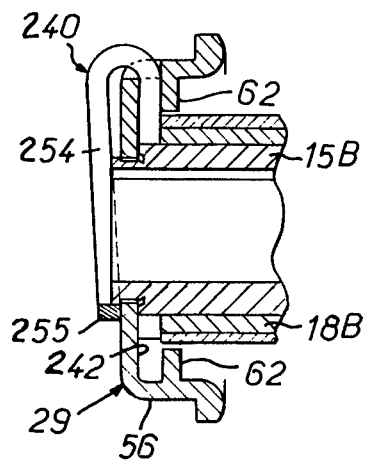
FIGS. 6 and 7 are each similar to FIGS. 3 and 4, showing a further embodiment of the invention.

For a more complete appreciation of the present invention, attention is invited to the accompanying drawings which show at least parts of a number of embodiments of the speed change device or variable transmission ratio device of the present invention.

Referring firstly to FIG. 1, the embodiment of the speed change device shown therein comprises a drive pulley 10A, a driven pulley 10B and an endless belt 12 looped around the pulleys.

Each of the pulleys 10A and 10B comprises two oppositely and coaxially disposed side plates 13 and 14, each of which has an inclined side surface as shown, thereby defining a belt-receiving groove of generally frustoconical configuration. The plate 13 is a movable plate which is mounted for axial movement relative to the fixed plate 14, the plate 13 being subject to actuation by a resilient return means which is responsive to centrifugal force generated by rotation of the pulley.

In FIG. 1, the fixed plate 14 of the drive pulley 10A is fixed in any suitable manner radially on a sleeve 15A adjacent one end thereof (see also FIG. 1A). The sleeve 15A is carried on a drive shaft 16A which serves to support and drive the pulley 10A, insofar as the sleeve 15A is fixed in rotation to the shaft 16A by a key 17A and is also axially fixed in any suitable manner (not shown) on the shaft.

The movable plate 13 of the drive pulley 10A is carried radially by a carrier member in the form of a bush 18A which is slidably mounted on the sleeve 15A. Each side plate 13 and 14 is fixed with respect to the member 15A and 18A respectively which carries the side plate, by any suitable means such as adhesive, welding, brazing or press-fitting.

The driven pulley 10B is generally of a similar construction to the pulley 10A, and thus comprises a fixed side plate 14 which is carried fixedly by a sleeve 15B fixed against rotation on a support shaft 16B by a key 17B. The sleeve 15B is also fixed against axial sliding movement on the shaft, so that the plate 14 is accordingly also fixed against axial movement on the shaft.

The movable 13 of the pulley 10B is carried radially by a support member in the form of a bush 18B slidably mounted on the sleeve 15B.

In the FIG. 1 embodiment, a pulley 20 with a peripheral groove is also fixed on the shaft 15B of the driven pulley 10B. The pulley 20 forms the output member of the speed change device, whose input member is the shaft 16A.

Such an arrangement is known per se and, not being part of the present invention, will not be described in greater detail hereinafter.

Referring now again to FIGS. 1 and 1A, the above-mentioned resilient return means acting on the movable plate 13 of each pulley acts to urge the movable plate 13 axially towards the associated fixed plate 14. Such resilient means comprise an annular member 22, usually referred to, and so referred to hereinafter, as a diaphragm. The diaphragm 22 comprises a peripheral portion 24 which forms a resilient washer structure of a Belleville washer type, and a central portion which is divided into a plurality of radially extending fingers 25 by radially extending slots 26.

At its peripheral portion 24, the diaphragm 22 bears against the movable plate 13, more specifically against an axially extending annular portion or rim 28 at the periphery of the movable plate 13. The free, radially inward ends of the fingers 26 of the diaphragm 22 bear against an annular support or abutment member 29 which is axially fixed relative to the fixed plate 14. Thus, as shown in FIG. 1, the member 29 of e.g. the drive pulley 10A is carried radially by the sleeve 15A at the end of the sleeve 15A remote from the plate 14. The member 29 may be fixed on the sleeve 15A by a spline-like arrangement which will thus prevent rotary movement between the sleeve 15A and the member 29. The member 29 is advantageously of a harder material then the material of the sleeve 15A and its inwardly facing peripheral surface is provided with a tooth-like configuration which machines or forms grooves of the above-mentioned spline-like arrangement, in the peripheral surface of the reduced-diameter end portion of the sleeve 15A, as clearly shown in FIG. 1A, when the member 29 is fitted with a press fit onto said reduced-diameter end portion. Ahead of the member 29, as shown in FIG. 1A, the above-mentioned peripheral surface of the reduced-diameter portion has a groove provided to receive the material removed from the sleeve 15A by the machining action of the teeth on the member 29 as it is force-fitted onto the sleeve. The adjacent axial end of the above-mentioned reduced-diameter portion of the sleeve is flattened or burred over after the member 29 has been fitted, to fix the member 29 axially on the sleeve.

The annular member 29 of the pulley 10B is held on the sleeve 15B by a spline-type arrangement as described above in relation to the pulley 10A.

Each diaphragm 22 also provides, besides the resilient return means, means which are responsive to centrifugal force generated by rotation of the pulley, and for this purpose, and to increase the sensitivity to such centrifugal force, at least some of the fingers 25 each carry a small weight member 30 as shown in FIG. 1.

In the embodiment illustrated, and in a manner also known per se, the movable side plate 13 of a pulley 10A, 10B and the diaphragm 22 which acts resiliently thereon are interconnected for transmission of the rotary drive therebetween, the diaphragm 22 itself being fixed against rotation with respect to the corresponding sleeve 15A and 15B by means of lugs 32 which are carried by and project axially from the corresponding annular member 29 and which are each engaged between two radial fingers of the diaphragm, by extending into the slot therebetween.

Furthermore, in an arrangement which is not part of the present invention and which will not be described in greater detail herein, engagement blocks 34 are mounted on the peripheral portion 24 of each diaphragm 22, and co-operate with the associated movable plate 13 by engaging into grooves or recesses 36 provided for this purpose in a complementary manner at the periphery of the movable plate 13.

The movable plate 13 of at least one pulley, as shown the drive pulley 10B, has a clearly defined initial rest position from which it is axially movable towards the associated fixed side plate 14. This rest position thus provides a limit to the variation in the transmission ratio between the two pulleys, as when starting up.

More particularly, and in accordance with the invention, the driven pulley 10B has two axially displaced abutment; a first abutment 40 which defines said rest position of the plate 13 and which is mounted so as to be retractable relative to the movable plate 13 between a first or operative position in which the abutment 40 prevents axial movement of the movable plate 13 away from the associated fixed plate 14, beyond the said rest position of the movable side plate, and a second or retracted position in which the abutment 40 axially frees the movable plate 13 and thus permits an additional axial movement of the movable plate 13 away from the fixed plate 14 beyond the initial rest position, to a retracted position in which the belt 12 can be removed from the other pulley 10A in a manner to be described hereinafter. The second of the two abutments is indicated at 42, and acts as a final stop abutment to define the retracted, axially displaced, position of the movable plate 13. The stop abutment 42 is axially fixed with respect to the plate 14.

In FIGS. 1 and 2, the stop abutment 42 is formed by the face of the annular member 29 which is directed towards the movable plate 13; like that annular member 29, the stop abutment 42 is therefore non-removable from the sleeve 15B.

In the embodiment illustrated in FIGS. 1 and 2, the first abutment 40 is mounted for axial movement between its operative and retracted positions, being disposed between the stop abutment 42 and the movable plate 13.

The abutment 40 is carried by a transverse support plate 43 which is arranged axially at the side of the stop abutment 42 remote from the movable plate 13. The plate 43 is arranged so that it is held axially in a disconnectible manner. The abutment 40 has at least one axially extending abutment limb or leg 44 which extends towards the movable plate 13 from the support plate 43. The or each limb 44 has a shoulder 45 arranged to cooperate with the stop abutment 42 (FIG. 2) for retaining the abutment 40 in place behind the abutment 42.

In the embodiment illustrated, the plate 43 of the abutment 40 is axially fixed at the end of the sleeve 15B on which the movable plate 13 is slidably mounted, being held thereto by a bolt 47 engaged in a screw-threaded bore provided in the adjacent end portion of the shaft 16B.

Furthermore, as illustrated, the abutment 40 comprises a plurality of said legs or limbs 44, and these are uniformly distributed in a circular configuration and each pass through an aperture 49 provided for this purpose in the member 29. At the inward side of the member 29 remote from the abutment 42, the legs or limbs 44 are interconnected by an annular collar portion 50 which is directed radially inwardly towards the axis of the assembly, i.e. the axis of the shaft 16B.

The face of the collar portion 50 which is directed towards the plate 43 forms the above-mentioned shoulder 45 while the other face of the collar portion 50 forms the face of the abutment 40 against which the movable plate 13 bears in its initial rest position as shown in FIG. 1.

At their free ends, the legs or limbs 44 of the abutment 40 pass through the plate 43 by virtue of apertures 51 provided for this purpose in the plate 43. At the other side of the plate 43, the ends of the legs or limbs 44 are deformed as by crimping, as indicated at 52, over the face of the plate 43. The appropriate crimping operation is so effected as to cause an enlargement in the end portion of the legs or limbs 44, to prevent axial movement of the legs or limbs 44 relative to the support plate 43 to which they are thus fixed.

In practice, the resilient loading of the diaphragm 22 of the drive pulley 10A is generally higher than that of the diaphragm 22 of the driven pulley 10B in such a way that, when the arrangement is at rest and as shown in FIG. 1, the movable plate 13 of the drive pulley 10A is urged into the rest position in which it is axially close to the associated fixed plate 14. On the other hand, bearing in mind the equilibrium condition necessarily assumed by the belt 12 between the two pulleys 10A and 10B by virtue of its constant length, in the rest position of the arrangement shown in FIG. 1 the movable plate 13 of the driven pulley 10B will have a rest position in which it is axially remote from the fixed plate 14, this being against the action of the resilient diaphragm 22.

In this position, the side plate 13 bears axially against the abutment 40, more specifically against the collar portion 50. Thus, with the pulleys in this condition, there is between the shaft 16A and the pulley 20, a given transmission ratio defined by the rest position of the movable plate 13 of the driven pulley 10B.

In operation, when the shaft 16A of the pulley 10A is driven in rotation by any suitable drive means (not shown), the effect of centrifugal force to which the diaphragm 22 of the drive pulley 10A is subjected cause the diaphragm 22 to assume a configuration which increasingly approaches a flat condition, in proportion to the increase in rotary speed of the shaft 16A. In this way, the movable plate 13 of the drive pulley 10A moves away from the fixed plate 14 of the pulley against the force of the resilient diaphragm 22. Thus, the belt 12, between the side plates 13 and 14 of the drive pulley 10A, assumes a fresh equilibrium condition as a function of the pulley speed, the belt 12 thus riding in the groove at a radially inwardly displaced position. This therefore permits the belt to ride outwardly on the pulley 10B, which accordingly permits the movable plate 13 of the pulley 10B to move towards the fixed plate 14, by a distance which is concomitant with the distance by which the movable plate 13 of the drive pulley 10A moves away from its fixed plate 14.

The above-mentioned changes in the positions of the respective side plates 13 and 14 cause a change in the transmission ratio between the input shaft 16A and the output pulley 20. This arrangement is known per se and will not be described in greater detail hereinafter.

It is found necessary to change the drive belt 12, for example because of the amount of wear which the belt has suffered, it is sufficient, as shown in FIG. 2, to unscrew the bolt 47 by a sufficient amount for the plate 43 and thus abutment 40 to be able to move axially from the first position of the abutment as shown in FIG. 1 in which it defines the rest position of the movable side plate 13, to a retracted position as shown in FIG. 2 in which the abutment 40 bears against the stop abutment 42 formed by the corresponding face of the member 29.

In this retracted position, the abutment 40 axially frees the movable plate 13 and permits the additional axial movement of the plate 13 away from the fixed plate 14. The movable plate 13 can thus move from its initial rest position as shown in FIG. 1, to its retracted axially displaced position as shown in FIG. 2 and as defined by the abutment 42. In this position, the axial distance between the plates 13 and 14 of the driven pulley 10B is sufficient for the drive belt 12 to move radially inwardly to the bottom of the groove between the plates 13 and 14. When this happens, the additional slack provided in the belt 12 means that the belt 12 can then be removed around the periphery of the drive pulley 10A and can thus be removed therefore as clearly visible in FIG. 2. Finally, the belt 12 is removed from the driven pulley 10B.

A new belt 12 is set in position in a similar manner, by first engaging the belt 12 onto the pulley 10B and pushing it into the bottom of the drive groove thereof, and then fitting the belt over the pulley 10A. After the new belt 12 has been fitted into position, the bolt 47 is tightened again so that the abutment 40 assumes its initial or operative position and the movable plate 13 of the driven pulley 10B is positively moved back into its initial rest position. In this way, the initial transmission ratio of the speed change device is resumed, without any adjustment.

It will be appreciated that when changing a belt, the stop adjustment 42, more precisely the member 29 of which one face forms the stop abutment, remains axially fixed in position and thus prevents any excessive and ultimately disassembly of the driven pulley 10B such as could possibly occur if unscrewing of the bolt 47 should unfortunately result in the bolt 47 coming out of its screw-threaded bore in the shaft 16B.

Thus, in the retracted FIG. 2 position of the abutment 40, the shoulder 45 formed by the face of the collar portion 50, which is towards the abutment 42, co-operates with the abutment 42, to give a retaining action for the abutment 40, to prevent further axial movement of the abutment 40 along the shaft 16B. This therefore prevents further axial movement of the movable plate 13 away from the fixed plate 14.

In the foregoing description of FIGS. 1 and 2, the abutment 40 is movable between its two positions by an axial motion.

However, in alternative embodiments as illustrated in FIGS. 3 through 7, an abutment 140 is mounted so as to be movable radially between first and second positions, being disposed between a stop abutment 142 and the movable side plate 13.

In these embodiments, the abutment 140 has two side limbs 54 which are connected together by a central connecting portion 55, thus forming a resiliently deformable, generally U-shaped, clip-like component.

The annular member 29 further comprises at its periphery an axially extending ring portion or rim 56 provided with apertures 57 (see e.g. FIG. 4) through which the limbs 54 of the abutment clip 40 can be engaged by a transverse movement from the outside the member 29. The central connecting portion 55 of the abutment 40 thus remains outside the rim 56, as is clearly visible in both FIGS. 4 and 5.

In the embodiments shown in FIGS. 3 through 5, there is a sufficient number of such apertures 57 for the limbs 54 of the abutment clip 40 to be able to pass transversely completely through the rim 56 of the member 29, to emerge at the other side thereof.

Furthermore, in the embodiments of FIGS. 3 through 5, each limb 54 comprises, at each side of the central connection portion 55, a respective circumferential deformation portion 58 which is generally directed towards the other side limb and by way of which the U-shaped clip bears against the part of the rim 56 which is radially closest to the central connecting portion 55, on the outside of the rim 56.

Likewise, at its free end, each side limb 54 comprises a circumferential deformation portion 59 which is generally directed towards the other limb 54 of the clip and by means of which such clip bears against the part of the rim 56, which is radially most remote from the central connecting portion 55, on the outside of the rim 56.

In the embodiment of FIGS. 3 and 4, each deformation portion 58 is adapted or matched to the local configuration of the rim 56 and the portion 59 is formed by a simple undulation or curve.

The abutment clip 140 is movable radially in contact with the face of the member 29 which forms the stop abutment 142, or in the vicinity of such face, between a first or operative position shown in solid lines in FIG. 4, in which the limbs 54 are disposed on respective sides of the sleeve 15B between the stop abutment 42 and the adjacent end face of the bush 18B (see FIG. 3), the side limbs 54 thus defining the initial rest position of the movable plate 13 as described above, and a second or retracted position shown in broken lines at I in FIG. 4, in which the side limbs 54 are partially disengaged from the rim 56 and are thus radially spread apart resiliently. In a particular embodiment, the edges of the apertures 57 in which the side limbs 54 are engaged are so positioned circumferentially that when the U-shaped clip is withdrawn radially, the side limbs 54 thereof are resiliently moved apart by bearing against the said edges of the apertures 57.

In the operative position of the abutment 140 (solid lines in FIG. 4) the deformation portions 58 and 59 co-operate with the rim 56 to secure the abutment 140 in a stable fashion in this position. In its retracted position, the U-shaped clip 140 axially frees the movable plate 13 and thus permits the belt 12 to be easily changed, as described above. When the belt 12 has been changed, the limbs 54 of the abutment clip 140 are then re-engaged radially into the rim 56 of the member 29. However, when this is done, as the movable plate 13 has been moved axially away from the fixed plate 14 to permit the belt change, the limbs 54 of the clip 140 then engage over the bush 18B carrying the movable plate, in the position of the limbs 54 shown diagrammatically in broken lines at II in FIG. 4.

As soon as the motor or drive means driving the speed change device is started, to rotate the pulleys 10A and 10B, centrifugal force will be applied to the weight members 30 of the diaphragm 22 of the driven pulley 10B. As a result, the movable plate 13 of the driven pulley 10B, against which the diaphragm 22 acts, will of its own accord move away from the stop abutment 142 by an axial distance sufficient for the limbs 54 to resiliently resume their normal operating position corresponding to the first position of the abutment 140, as shown in solid lines in FIG. 4.

As will be appreciated, no tool is required for moving the U-shaped abutment clip 140 from its first to its retracted position, nor for returning it to its first position.

As illustrated in FIG. 3, the rim 56 of the member 29 can be provided on its interior surface with radially extending limbs or lugs 62 for guiding the abutment clip 40, when it is moved between its respective positions as referred to above.

In the foregoing described embodiment, the U-shaped abutment clip 40 can be removed radially from the rim 56 of the member 29. In the embodiment shown in FIG. 5 however, each limb 54 is extended, at its end remote from the portion 55, by a limb portion 63 which is turned in a hook-like configuration outwardly of the U-shape. When the U-shaped clip 140 is moved from its first to its retracted position, the portions 63 engage around the edges of the respective apertures 57 in the rim 56 and therefore prevent the clip from being fully removed from the rib 56. In addition, the portions 63 ensure that the limbs 54 are moved apart, by bearing against the outside surface of the rim 56 to provide a camming action in spreading the limbs 54.

In the embodiment of FIG. 5, each limb 54 also comprises in its central portion, midway of its length, an undulation or curve 64 such that the limb 54 is locally adapted or matched to the circular outside surface of the bush 18B carrying the movable side plate 13, for temporarily holding or clipping the clip in position on the bush 18B when the clip 140 is returned to its first or operative position after a belt change.

Figure 7:
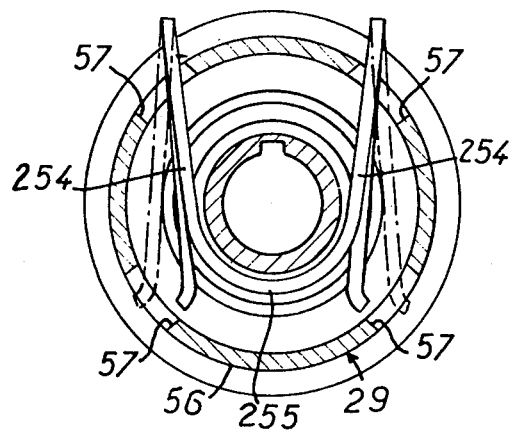

In FIGS. 6 and 7, a central connecting portion 255 of an U-shaped abutment clip 240 is bent over the outside of the rim 56, so as to extend generally parallel to the limbs 254. With this configuration, in the first position of the abutment 240 in which it defines the rest position of the plate 13, the central connecting portion 255 can be engaged around the end portion of the sleeve 15B which projects axially beyond the member 29, as is clearly visible in FIG. 6.

So that the abutment clip 240 can then be displaced radially from its operative position to its retracted position, to permit the further axial movement of the movable plate 13 for a belt change operation, the central connecting portion 255 must first be axially disengaged from the end portion of the sleeve 15B, for example by means of a hook or like tool.

In the foregoing embodiments, the above-mentioned engagement blocks 34 carried by the peripheral portion 24 of a diaphragm 22 not only provide for centering of the diaphragm 22 relative to the movable plate 13 associated therewith, but they also provide for transmission of the rotary drive between the diaphragm 22 and the removable plate 13. Alternatively, other suitable engagement drive means can be provided, to perform this drive transmission function.

Figure 8:
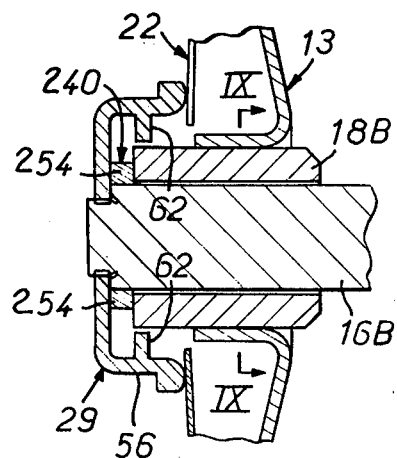
FIG. 8 is an axial cross-sectional view of yet a further embodiment of the speed change device according to the invention.
Figure 9:
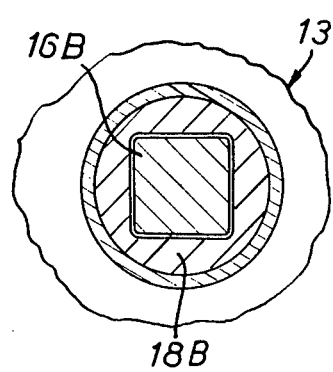
FIG. 9 is a transverse sectional view of the FIG. 8 construction, in section along line IX—IX in FIG. 8.

However, in the embodiment illustrated in FIGS. 8 and 9, showing part for example of the driven pulley 10B, the rotary drive of the movable side plate 13 is provided directly by the shaft, or another support member such as bush 18B, on which the movable plate 13 is mounted. For example, at least the end of the shaft 16B is of a polygonal transverse section, for example a square section, as shown in FIG. 9. Similarly, the bush 18B carrying the movable plate 13 is of a complementary polygonal, such as square, transverse section.

It will be appreciated that the present invention is not limited to the embodiments described and illustrated herein, but includes many alternative forms and/or combination of various components thereof, and various modifications can be thus made without thereby departing from the spirit and scope of the present invention. For example, it is not necessary for the side limbs of the U-shaped clip which provides the first abutment 140 to have the circumferential deformation portions 58 at the sides of the central connecting portion 55 and/or the central connecting portion 55 can form a torsion spring.

As has been noted above, the side plates 13, 14 of a pulley of the speed change device according to the invention can be mounted on the corresponding support member, namely the sleeve or the bush, by a spline-type arrangement of the type described in connection with the annular support member 29; as can be seen for example from FIG. 3 in respect of the driven pulley 10B of that embodiment, each side plate 13 and 14 is fitted on the associated support member, namely the bush 18B and the sleeve 15B respectively, by a spline-type assembly which provides for fixing the side plates non-rotatably on the support member. Each side plate is of a material which is harder than the material forming the respective support member, and its inwardly facing peripheral surface is provided with a tooth-like configuration which forms or machines the grooves or splines in the outside peripheral surface of the support member, when the respective side plate was force-fitted onto its support member.

What is claimed is:

1. A speed change device comprising first and second pulleys and an endless drive belt engaged around said pulleys, said pulleys each having a fixed side and a movable side shiftable axially relative to its fixed side in accordance with the rotational speed thereof, said side plates having inclined side surfaces defining a belt receiving groove, one of said pulleys having a first abutment member for defining the limit of axial separation of its movable side relative to its fixed side in the course of normal operation of the speed change device, a second abutment member axially and rotatably fixed with respect to said fixed side and defining a maximum limit of axial separation of said movable side relative to said fixed side greater than the first mentioned limit to permit access to the drive belt, and means including releasable stop means mounting said first abutment member for displacement between a first operative position corresponding to the first-mentioned limit and a second retracted position in which the second abutment member determines the maximum limit of axial separation between said sides thereby preventing disassembly of the movable side when gaining access to the belt.

2. A device as set forth in claim 1 wherein said first abutment is mounted for movement between its said operative and retracted positions by an axial motion.

3. A device as set forth in claim 2 wherein said first abutment includes a transverse support plate which is disposed axially outward of said second abutment and axially remote from said movable side plate of said at least one pulley and which is capable of being disengageably fixed axially with respect to said fixed side plate, and at least one axially extending abutment limb which extends towards said movable side plate from said support plate and which has a shoulder disposed at the other side of said second abutment, said shoulder being co-operable with said second abutment for retaining said first abutment in its said retracted position.

4. A device as set forth in claim 3 wherein said first abutment comprises a plurality of said axially extending limbs, and said limbs, at their ends towards said movable side plates, are interconnected by a common annular collar portion.

5. A device as set forth in claim 4 including a support means which is axially fixed with respect to said fixed side plate, and wherein said second abutment is formed by one of the faces of said support means and said axially extending limbs extend through said support means by way of apertures provided therein.

6. A device as set forth in claim 1 wherein said movable side plate is mounted for axial movement between its initial rest and retracted positions on a cylindrical carrier member, wherein said first abutment comprises two side limbs and a central portion interconnecting said side limbs thereby to generally define a resiliently deformable U-shaped component, wherein said side limbs extend on respective sides of said cylindrical carrier member, and wherein said U-shaped component is movable radially between said operative and retracted position around said cylindrical carrier member.

7. A device as set forth in claim 6 wherein said first abutment is mounted for movement between its respective positions by a radial motion.

8. A device as set forth in claim 6 wherein there are co-operating means on said carrier member for reacting on said side limbs of the U-shaped component to resiliently space said side limbs apart in said retracted position of said first abutment.

9. A device as set forth in claim 6 wherein said carrier member has a portion comprising an axially extending rim providing through apertures through which said side limbs of said U-shaped component are transversely engaged from the outside of said rim, said central connecting portion of said U-shaped component remaining outside of said rim.

10. A device as set forth in claim 9 wherein said rim apertures are adapted to permit said side limbs to pass transversely completely through said rim from one side to said carrier member portion to the other.

11. A device as set forth in claim 9 wherein each said side limb comprises, at respect sides of said central connecting portion, a circumferential deformation portion which at least in said operative position of said first abutment bears against a part of said rim which is towards said central connecting portion.

12. A device as set forth in claim 9 wherein each said limb comprises a circumferential deformation portion which at least in said operative position of said first abutment bears against a part of said rim which is radially remote from said central connecting portion.

13. A device as set forth in claim 6 wherein in its lengthwise central portion each of said side limb has a curved portion.

14. A device as set forth in claim 6 wherein each said side limb is extended at its free end remote from said central connecting portion by a hook-like limb portion which is turned to the outside of said U-shaped component.

15. A device as set forth in claim 6 wherein said central connecting portion has a bend so as generally to extend parallel to said side limbs.

16. A device as set forth in claim 5 wherein said fixed side plate is fixed on a support member, wherein said support means is an annular member fixed by a force-fit to said support member by a spline-type connection which mounts said annular member on said side plate support member non-rotatably relative thereto, said annular member being of a harder material than the material of said side plate support member and having on its inwardly facing peripheral surface a tooth-like configuration which when said annular member was force-fitted to said side plate support member machined grooves of said spline-type connection in the outward peripheral surface of said side plate support member.

17. A device as set forth in claim 1 wherein said second abutment is non-disassembleable.

18. A device as set forth in claim 1 wherein at least one of said side plates of at least one of said pulleys is connected by a force-fit to a support member carrying same, by a spline-type connection which provides for a non-rotatable mounting of said side plate on said support member, said side plate being of a harder material than the material of said support member and having its inwardly facing peripheral surface provided with a tooth-like configuration which when said side plate was force-fitted on said support member machined grooves forming said spline-type connection in the outward peripheral surface of said support member.

19. A device as set forth in claim 1 including a diaphragm operatively associated with the movable side plate of each said pulley, for urging same towards its rest position, the diaphragm being fixed against rotation relative to a support member on which said movable side plate is mounted for said axial movement, and the diaphragm having engagement means engaged with said movable side plate, for the transmission of rotary drive between said support member and said movable side plate.

20. A device as set forth in claim 1 wherein a support member on which said movable side plate is movably mounted is of a polygonal section such as square transverse section, for the transmission of rotary drive between said support member and said movable side plate.

21. A pulley for a speed change device comprising rotary shaft, a fixed side and a movable side coaxially arranged about said rotary shaft and facing each other and defining an axially variable belt-receiving groove therebetween, resilient means biasing said movable side towards said fixed side and means responsive to the rotational speed of the pulley for controlling the separation of said movable side from said fixed side in the course of operation of said speed change device, two axially spaced abutment members including a first or operational abutment member retractably mounted relative to said shaft and having an operative position for defining the maximum axial separation of said movable side from said fixed side in the course of operation of said speed change device and a second retracted position for permitting additional axial separation of said movable side to a retracted position for introducing or removing a driven belt and a second or stop abutment member axially and rotatably fixed with respect to said fixed side and defining the maximum retracted position of said movable side when said first abutment member is in its retracted position and thereby preventing said movable side from coming off said shaft at such time as said sides are widely spaced to process access to an associated drive belt.

* * * * *